Patented Dec. 21, 1937

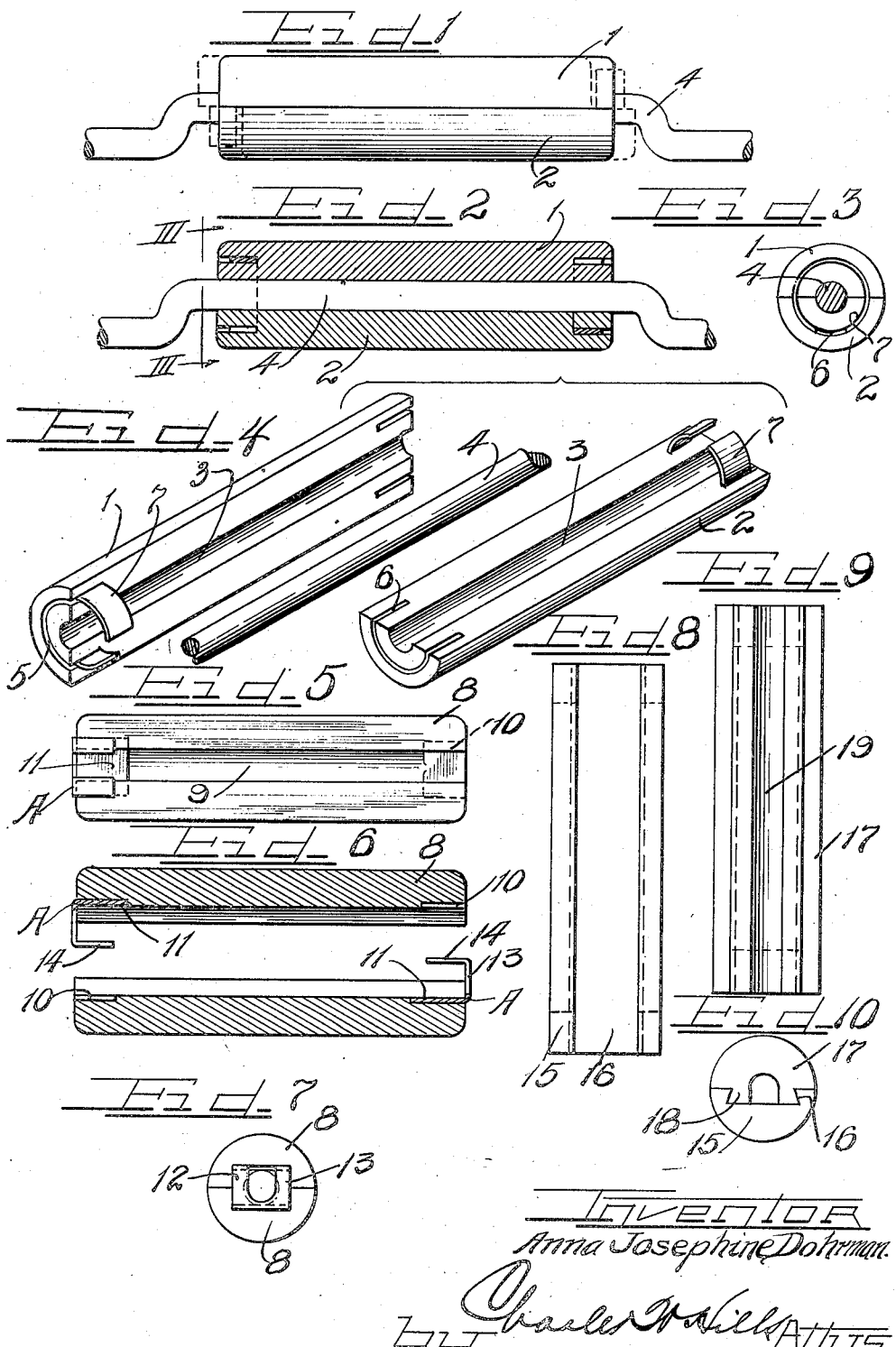

2,102,839

UNITED STATES PATENT OFFICE 2,102,839

HANDLE CONSTRUCTION

Anna Josephine Dohrman, River Grove, Ill.

Application January 18, 1937, Serial No. 121,155

5 Claims. (Cl. 16—110)

The present invention relates to handle construction and more particularly, although not exclusively to handles so constructed as to be used for replacements for broken handles of household utensils, such for example, as tea kettles, egg beaters, kitchen spoons, pails, can openers, and the like and also may be readily used as handles for carrying bundles, packages and the like.

Many household utensils, such for example, as egg beaters, tea kettles, kitchen spoons, pails, can openers and the like, are provided with wooden handles. Such handles often break. It has been the experience of many a housewife that when such handles break the only way to replace a broken handle is to buy a new utensil, which is an expensive manner to replace a simple wooden handle, as under the circumstances the utensil has to be discarded.

The present invention is directed to a replacement handle construction whereby any broken wooden handle of a utensil may be replaced by purchasing a handle of the present invention and applying it to the utensil, which can be readily done.

An object of the present invention is to provide a handle construction whereby a broken handle of a utensil may be replaced without having to remedy the broken handle by discarding the utensil, simply by providing a utensil with a new handle.

Another object of the present invention is to provide a replacement handle construction of separable members which together cooperate to surround a bail, and which are readily connected together by a simple movement of the members.

A further object of the present invention is to provide replacement handles which are economical to manufacture, easy to apply and satisfactory in use.

A still further object of the present invention is to provide a separable handle comprising complemental members fastened together against lateral separation by relative movement of the members.

The above other and further objects of the present invention will be apparent from the following description and accompanying drawing.

The accompanying drawing illustrates embodiments of the present invention and the views thereof are as follows:

Figure 1 is a side elevational view of a handle construction of the present invention showing it applied to a fragmental portion of a bail and showing in full lines the relationship of the parts or members when the same are connected together, and in dotted lines certain relative positions of the members during connection or separation.

Figure 2 is a longitudinal vertical sectional view through the arrangement shown in Figure 1.

Figure 3 is a vertical sectional view taken substantially in the plane of line III—III of Figure 2.

Figure 4 is an exploded view showing two complemental members provided with preferred means for securing them together about a bail. The angular relationship of the member at the right of the figure is different from the angular position of the member at the left, made so for the purpose of more clearly showing the cooperating interlocking elements of this form of the invention.

Figure 5 is a side elevational view of a constituent handle member showing another form of a locking means.

Figure 6 is a vertical section through two members of the handle, such as that shown in Figure 5 showing the parts separated and disconnected, and showing certain details of construction.

Figure 7 is an end view of a handle of the character illustrated in Figures 5 and 6 with the members interlocked together.

Figure 8 is a bottom plan view of another form of member showing a dove-tail groove formed in the bottom of the member.

Figure 9 is a bottom plan view of a member for cooperating with the member of Figure 8, showing a dove-tail tenon.

Figure 10 is an end view of a handle consisting of the members shown in Figures 8 and 9, in assembled relationship.

The drawing will now be explained.

The handle construction of the present invention is herein illustrated as comprising two complemental members 1 and 2, each being formed in the shape of a semi-cylinder with a central semi-cylindrical bore 3 for receiving a bail 4.

The word "bail" is herein used generically and includes bails such as are used on tea kettles, cranks as used on egg beaters, as well as ends of spoons which normally receive wooden handles, and similar household and like utensils.

The members 1 and 2 are shown in detail in Figure 4.

The member 1 has formed in each of its ends a cylindrical groove 5, extending inwardly from the ends of the member or part.

The member or part 2 is fashioned with like grooves 6, extending inwardly from its ends.

In one of the grooves 5 at one end of the member 1 is inserted a split ring 7 which is of flat metal of greater width than thickness, and with its ends outwardly of the bottom, that is, the flat face of the member 1. In the groove 6 at the opposite end of the member 2, a like ring 7 is inserted in the groove, the rings 7 being seated in the bottoms of the grooves 5 and 6 respectively.

To assemble a handle comprising members 1 and 2, the handle members are placed against a bail 4 with the bail within the semi-cylindrical bores 3 of the members and with the rings or tongues 7 registering with the grooves at the opposite ends of the members 1 and 2 respectively. The members are then given relative movement to bring their ends into register which movement causes the tongues to enter the grooves of the other members and thus lock the members together against lateral separation.

The dotted lines in Figure 1 show the members with their rings or tongues partially engaged in the grooves of the other members, and in full lines, fully engaged with the members locked together for use.

In the form of the invention illustrated in Figures 5 and 6, a handle member 8 formed as a semi-cylinder with a central semi-bore 9 for a bail. Extending into the ends of the member 8 are grooves 10 which are flat as distinguished from the semi-circular grooves 5 and 6 of the members 1 and 2. Each of the members 8 is provided at both ends with similar flat grooves 10.

A hook member designated generally at A is inserted in one of the grooves 10 at one end of one of the members 8 and another hook member inserted in the groove 10 at the other end of the other member. Each of the hook members A has a tail piece 11 to enter a groove 10, bifurcated legs 12 and 13, the extremities of which are bent backwardly as at 14 to serve as prongs or tongues for entering the grooves of the other member when the members are assembled by endwise movement with respect to each other. The provision of the bifurcated legs 12 and 13 enables the same to pass about the bail 4 when the handle members 8 are applied about the bail and connected together constituting a handle. The members 8 are applied to a bail in the same manner as the members 1 and 2 heretofore described and connected together by a relative movement of the members in directions to bring the ends of the members in register.

The handle construction shown in Figures 8 to 10 inclusive, includes one member 15 formed with a dove-tail groove 16 extending from end to end of the member and another member 17 having a dove-tailed tenon 18 likewise extending from end to end in the member 17. Member 17 is provided with a central bore 19 for the reception of a bail.

The members 15 and 17 are connected together by engaging one end of the tenon 18 of the member 17 with the dove-tail groove 16 of the member 15 and moving these members relatively to each other to bring their ends into register, thus locking the members together against lateral separation.

It will be observed that the handle construction of the present invention provides a replacement handle of complemental members which are readily connected together by simple relative movement, so that any broken handle of any utensil may be readily replaced by a replacement handle of the present invention.

The amount of relative endwise movement necessary to assemble the component members of a handle of the present invention is that represented by the axial width of the tongues 7 of the form of the invention illustrated in Figs. 1 to 4 inclusive, and the legs of the tongues 14 of the form of the invention illustrated in Figs. 5 to 7 inclusive.

The form of the invention illustrated in Figures 8 to 10 inclusive, is not intended for replacement of utensil handles, but for other purposes, such for instance as a carrying handle for bundles or packages. The handle construction of any of the figures illustrated may be readily used as a handle for carrying bundles and packages, eliminating the usual wire supplied with such handles.

The forms of the handle illustrated and described may be readily assembled about cord or twine in the manner described with reference to the bail 4. When the handles of the present invention are utilized for carrying packages, the same may be secured directly to the tying cord or twine as may be readily understood.

Should it so happen that the handle of the present invention be applied to a kitchen spoon to replace the broken wooden handle of the spoon, and it is desired to prevent rotative movement of the replacement handle on the spoon shaft, then any suitable filler, such as friction tape may be applied between the shaft of the spoon and the replacement handle.

The bail illustrated in Figures 1 and 2 has an offset portion such as is sometimes customary in the manufacture of tea kettles and like utensils. In such event the handles of the present invention would be made short enough to be applied to such offset portions allowing sufficient endwise movement of the component parts or members for assembling the same about such offset bail portions.

Instead of having the tenon and groove of the members 15 and 17 extend the full lengths of the members as shown, these might be made short as indicated in dotted lines in Figs. 8 and 9, so that endwise movement of the members to effect connection would be no greater than the axial lengths of the tenons, in which event such handles could be used for replacement purposes in the same manner as the other forms of the invention.

The invention has been described herein more or less precisely as to details, yet it is to be understood that the invention is not to be limited thereby as changes may be made in the arrangement and proportion of parts, and equivalents may be substituted without departing from the spirit and scope of the invention.

The invention is claimed as follows:

1. A replacement handle construction including mating members adapted together to surround a bail, said members having cooperating tongues and grooves disposed only in the ends of said members for locking said members together, the engagement and disengagement of said cooperating parts being effected by a relative endwise movement of said members for a distance less than the length of said members.

2. A replacement handle construction including mating members adapted together to surround a bail, said members having cooperating tongues and grooves disposed only in the ends of said members for locking said members together with hook action against lateral separation, the engagement of said cooperating parts being effected by a relative endwise movement of said members for a distance substantially that of the lengths of the tongues.

3. A replacement handle construction including mating members adapted together to surround a bail, one member having a tongue adjacent one end and a groove enterable from the other end, the second member having a groove enterable at its one end and a tongue adjacent its other end, the tongues being engaged with said grooves by relative endwise movement of said members in a direction to bring their ends into register.

4. A replacement handle construction including mating members adapted together to surround a bail, one member having a tongue adjacent one end and a groove enterable from the other end, the second member having a groove enterable at its one end and a tongue adjacent its other end, the tongues being engaged with said grooves by relative endwise movement of said members in a direction to bring their ends into register, said tongues engaging said grooves with hook action.

5. A replacement handle construction including mating members adapted together to surround a bail, one member having a tongue adjacent one end and a groove enterable from the other end, the second member having a groove enterable at its one end and a tongue adjacent its other end, the tongues being engaged with said grooves by relative endwise movement of said members in a direction to bring their ends into register, said tongues and grooves being so fashioned as to prevent lateral separation of the members when the tongues are entered in said grooves.

ANNA JOSEPHINE DOHRMAN.